United States Patent
Schulert

(10) Patent No.: US 11,483,396 B2
(45) Date of Patent: *Oct. 25, 2022

(54) MANAGING APPLICATION ACCESS OF A MEDIA PLAYBACK SYSTEM

(71) Applicant: Sonos, Inc., Santa Barbara, CA (US)

(72) Inventor: Andrew Schulert, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,148

(22) Filed: Nov. 8, 2021

(65) Prior Publication Data

US 2022/0174118 A1    Jun. 2, 2022

Related U.S. Application Data

(63) Continuation of application No. 16/700,676, filed on Dec. 2, 2019, now Pat. No. 11,172,030, which is a
(Continued)

(51) Int. Cl.
*H04L 67/142* (2022.01)
*H04L 12/28* (2006.01)
(Continued)

(52) U.S. Cl.
CPC .......... *H04L 67/142* (2013.01); *H04L 12/282* (2013.01); *H04L 65/1069* (2013.01);
(Continued)

(58) Field of Classification Search
CPC . H04L 67/142; H04L 12/282; H04L 65/1069; H04L 65/80; H04L 63/101; H04L 63/108; H04L 2012/2849
See application file for complete search history.

(56) References Cited

U.S. PATENT DOCUMENTS

| | | |
|---|---|---|
| 5,406,634 A | 4/1995 | Anderson et al. |
| 5,440,644 A | 8/1995 | Farinelli et al. |
| | (Continued) | |

FOREIGN PATENT DOCUMENTS

| | | |
|---|---|---|
| EP | 1389853 A1 | 2/2004 |
| KR | 20090017795 | 2/2009 |
| | (Continued) | |

OTHER PUBLICATIONS

Pre-Brief Appeal Conference Decision dated Jul. 30, 2019, issued in connection with U.S. Appl. No. 14/330,754, filed Jul. 14, 2014, 2 pages.

(Continued)

*Primary Examiner* — Nicholas R Taylor
*Assistant Examiner* — Tania M Pena-Santana
(74) *Attorney, Agent, or Firm* — Akerman LLP

(57) ABSTRACT

Examples described herein may include a playback device receiving, from a control device, a validation-key that includes an application identifier corresponding to a controller application. The playback device may create a session identifier and transmit the session identifier to the control device. The playback device may receive, from the control device, a playback request comprising the session identifier and a playback command. The playback device may determine that the session identifier is valid and then execute the playback command. A computing system may receive identification information related to a controller application and generate the validation-key based on the controller application meeting at least one quality-control metric. The controller application may receive the validation-key from the computing system.

20 Claims, 8 Drawing Sheets

Related U.S. Application Data continuation of application No. 14/330,754, filed on Jul. 14, 2014, now Pat. No. 10,498,833.

(51) Int. Cl.
*H04L 65/80* (2022.01)
*H04L 65/1069* (2022.01)
*H04L 9/40* (2022.01)

(52) U.S. Cl.
CPC ............ *H04L 65/80* (2013.01); *H04L 63/101* (2013.01); *H04L 63/108* (2013.01); *H04L 2012/2849* (2013.01)

(56) References Cited

U.S. PATENT DOCUMENTS

| | | | |
|---|---|---|---|
| 5,761,320 A | 6/1998 | Farinelli et al. | |
| 5,856,827 A | 1/1999 | Sudo | |
| 5,923,902 A | 7/1999 | Inagaki | |
| 6,002,862 A | 12/1999 | Takaike | |
| 6,032,202 A | 2/2000 | Lea et al. | |
| 6,181,316 B1 | 1/2001 | Little et al. | |
| 6,255,961 B1 | 7/2001 | Van et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,728,531 B1 | 4/2004 | Lee et al. | |
| 6,732,155 B2 | 5/2004 | Meek | |
| 6,757,517 B2 | 6/2004 | Chang | |
| 6,778,869 B2 | 8/2004 | Champion | |
| 6,826,283 B1 | 11/2004 | Wheeler et al. | |
| 6,892,307 B1 * | 5/2005 | Wood | H04L 9/3263 726/8 |
| 6,985,694 B1 | 1/2006 | De Bonet et al. | |
| 7,017,118 B1 | 3/2006 | Carroll | |
| 7,020,048 B2 | 3/2006 | McComas | |
| 7,113,833 B1 | 9/2006 | Brown et al. | |
| 7,117,451 B2 | 10/2006 | Sielken | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,187,947 B1 | 3/2007 | White et al. | |
| 7,236,773 B2 | 6/2007 | Thomas | |
| 7,295,548 B2 | 11/2007 | Blank et al. | |
| 7,312,785 B2 | 12/2007 | Tsuk et al. | |
| 7,358,960 B2 | 4/2008 | Mak | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,742,740 B2 | 6/2010 | Goldberg et al. | |
| 7,805,682 B1 | 9/2010 | Lambourne | |
| 7,853,341 B2 | 12/2010 | McCarty et al. | |
| 7,899,187 B2 | 3/2011 | Messerges et al. | |
| 7,975,312 B2 | 7/2011 | Broderson et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,103,009 B2 | 1/2012 | McCarty et al. | |
| 8,131,390 B2 | 3/2012 | Braithwaite et al. | |
| 8,234,395 B2 | 7/2012 | Millington | |
| 8,387,124 B2 | 2/2013 | Smetters et al. | |
| 8,483,853 B1 | 7/2013 | Lambourne | |
| 8,590,028 B2 | 11/2013 | Saxena et al. | |
| 8,615,794 B1 | 12/2013 | Tomilson et al. | |
| 8,831,570 B2 | 9/2014 | Garskof | |
| 8,880,098 B2 * | 11/2014 | Shobatake | H04L 12/2812 455/414.3 |
| 8,910,265 B2 | 12/2014 | Lang et al. | |
| 8,942,252 B2 | 1/2015 | Balassanian et al. | |
| 8,955,069 B1 | 2/2015 | Dotan et al. | |
| 9,043,492 B2 | 5/2015 | A. R. et al. | |
| 9,065,819 B1 | 6/2015 | Shanmugam et al. | |
| 9,137,564 B2 | 9/2015 | Reimann | |
| 9,143,492 B2 | 9/2015 | Redberg et al. | |
| 9,178,962 B2 | 11/2015 | Le et al. | |
| 9,185,445 B2 | 11/2015 | Kirksey | |
| 9,223,862 B2 | 12/2015 | Beckhardt | |
| 9,226,072 B2 | 12/2015 | Bender et al. | |
| 9,232,277 B2 | 1/2016 | Vega-Zayas et al. | |
| 9,235,715 B1 | 1/2016 | Bailey et al. | |
| 9,264,413 B2 | 2/2016 | Zhang | |
| 9,286,384 B2 | 3/2016 | Kuper et al. | |
| 9,361,371 B2 | 6/2016 | Coburn, IV et al. | |
| 9,374,356 B2 | 6/2016 | Sondhi et al. | |
| 9,374,607 B2 | 6/2016 | Bates et al. | |
| 9,402,093 B2 | 7/2016 | Lieu et al. | |
| 9,411,942 B2 | 8/2016 | Commons et al. | |
| 9,460,755 B2 | 10/2016 | Coburn, IV | |
| 9,495,076 B2 | 11/2016 | Kumar et al. | |
| 9,501,533 B2 | 11/2016 | Coburn, IV et al. | |
| 9,531,833 B2 | 12/2016 | Le et al. | |
| 9,654,821 B2 | 5/2017 | Coburn, IV et al. | |
| 9,674,587 B2 | 6/2017 | Triplett et al. | |
| 9,684,484 B2 | 6/2017 | Kumar et al. | |
| 9,703,521 B2 | 7/2017 | Kumar et al. | |
| 9,735,978 B2 | 8/2017 | Kumar et al. | |
| 9,798,510 B2 | 10/2017 | Kumar et al. | |
| 9,813,400 B2 | 11/2017 | Ross et al. | |
| 9,876,780 B2 | 1/2018 | Kuper et al. | |
| 9,888,276 B2 | 2/2018 | Bolin | |
| 9,953,179 B2 | 4/2018 | Kumar et al. | |
| 9,977,561 B2 | 5/2018 | Bates et al. | |
| 10,116,652 B2 | 10/2018 | Kuper et al. | |
| 10,462,505 B2 | 10/2019 | Coburn, IV et al. | |
| 10,498,833 B2 | 12/2019 | Schulert | |
| 10,547,608 B2 | 1/2020 | Kuper et al. | |
| 10,708,259 B2 | 7/2020 | Vongsouvanh et al. | |
| 10,715,973 B2 | 7/2020 | Kumar et al. | |
| 2001/0042107 A1 | 11/2001 | Palm | |
| 2002/0002039 A1 | 1/2002 | Qureshey et al. | |
| 2002/0022453 A1 | 2/2002 | Balog et al. | |
| 2002/0026442 A1 | 2/2002 | Lipscomb et al. | |
| 2002/0077984 A1 | 6/2002 | Ireton | |
| 2002/0124097 A1 | 9/2002 | Isely et al. | |
| 2002/0146237 A1 | 10/2002 | Safadi | |
| 2002/0165921 A1 | 11/2002 | Sapieyevski | |
| 2002/0178191 A1 | 11/2002 | Sielken | |
| 2003/0023741 A1 | 1/2003 | Tomassetti et al. | |
| 2003/0060189 A1 | 3/2003 | Minear et al. | |
| 2003/0157951 A1 | 8/2003 | Hasty, Jr. | |
| 2003/0198257 A1 | 10/2003 | Sullivan et al. | |
| 2003/0210796 A1 | 11/2003 | McCarty et al. | |
| 2004/0024478 A1 | 2/2004 | Hans et al. | |
| 2004/0024688 A1 | 2/2004 | Bi et al. | |
| 2004/0025185 A1 | 2/2004 | Goci et al. | |
| 2004/0078383 A1 | 4/2004 | Mercer et al. | |
| 2004/0078812 A1 | 4/2004 | Calvert | |
| 2004/0215611 A1 | 10/2004 | Jawa et al. | |
| 2004/0261040 A1 | 12/2004 | Radcliffe et al. | |
| 2005/0028225 A1 | 2/2005 | Dawson et al. | |
| 2005/0108320 A1 | 5/2005 | Lord et al. | |
| 2005/0108413 A1 | 5/2005 | Melmon | |
| 2005/0155072 A1 | 7/2005 | Kaczowka et al. | |
| 2005/0166157 A1 | 7/2005 | Ollis et al. | |
| 2005/0262253 A1 | 11/2005 | Li et al. | |
| 2006/0085862 A1 * | 4/2006 | Witt | H04N 19/136 726/28 |
| 2006/0107237 A1 | 5/2006 | Kim | |
| 2006/0168340 A1 | 7/2006 | Heller et al. | |
| 2006/0253782 A1 | 11/2006 | Stark et al. | |
| 2007/0038999 A1 | 2/2007 | Millington | |
| 2007/0136778 A1 | 6/2007 | Birger et al. | |
| 2007/0142944 A1 | 6/2007 | Goldberg et al. | |
| 2007/0220430 A1 | 9/2007 | Sato | |

(56) References Cited

U.S. PATENT DOCUMENTS

| | | | |
|---|---|---|---|
| 2007/0250636 | A1* | 10/2007 | Stephens ............ H04N 21/6125 709/233 |
| 2007/0288470 | A1 | 12/2007 | Kauniskangas et al. |
| 2008/0005690 | A1 | 1/2008 | Van Vugt |
| 2008/0016465 | A1 | 1/2008 | Foxenland |
| 2008/0092204 | A1* | 4/2008 | Bryce ............. H04N 21/43637 348/E7.061 |
| 2008/0134256 | A1 | 6/2008 | Dacosta |
| 2008/0168568 | A1 | 7/2008 | Brodersen et al. |
| 2008/0250062 | A1 | 10/2008 | Huang et al. |
| 2008/0289006 | A1 | 11/2008 | Hock et al. |
| 2009/0222907 | A1* | 9/2009 | Guichard ............ H04L 63/1408 726/17 |
| 2009/0228919 | A1 | 9/2009 | Zott et al. |
| 2010/0076971 | A1 | 3/2010 | Barish et al. |
| 2010/0082731 | A1 | 4/2010 | Haughay et al. |
| 2010/0131567 | A1 | 5/2010 | Dorogusker et al. |
| 2010/0202755 | A1* | 8/2010 | Ariya ................... G11B 27/034 386/E5.003 |
| 2010/0284389 | A1 | 11/2010 | Ramsay et al. |
| 2011/0179455 | A1 | 7/2011 | Thompson |
| 2011/0264732 | A1 | 10/2011 | Robbin et al. |
| 2012/0117586 | A1 | 5/2012 | McCoy et al. |
| 2012/0304233 | A1 | 11/2012 | Roberts et al. |
| 2013/0347117 | A1 | 12/2013 | Parks et al. |
| 2014/0052770 | A1* | 2/2014 | Gran .................. H04N 21/8586 709/203 |
| 2014/0068328 | A1* | 3/2014 | Jain ..................... G06F 11/3676 714/15 |
| 2014/0096219 | A1 | 4/2014 | Lang et al. |
| 2014/0122695 | A1 | 5/2014 | Kulikov et al. |
| 2014/0149544 | A1 | 5/2014 | Le Nerriec et al. |
| 2014/0181947 | A1 | 6/2014 | Lund |
| 2014/0277639 | A1 | 9/2014 | Gomes-Casseres et al. |
| 2014/0279519 | A1 | 9/2014 | Mattes et al. |
| 2014/0282882 | A1 | 9/2014 | Tsui et al. |
| 2014/0330885 | A1 | 11/2014 | Schulert |
| 2015/0256600 | A1 | 9/2015 | Dakhane et al. |
| 2016/0301678 | A1 | 10/2016 | Bakar et al. |
| 2018/0007060 | A1 | 1/2018 | Leblang et al. |
| 2018/0225012 | A1 | 8/2018 | Bates et al. |
| 2018/0338177 | A1 | 11/2018 | Graham et al. |
| 2020/0387339 | A1* | 12/2020 | House .................... H04R 27/00 |

FOREIGN PATENT DOCUMENTS

| | | |
|---|---|---|
| WO | 200147248 | 6/2001 |
| WO | 200153994 | 7/2001 |
| WO | 2003093950 A2 | 11/2003 |

OTHER PUBLICATIONS

Preinterview First Office Action dated Jul. 14, 2017, issued in connection with U.S. Appl. No. 14/606,162, filed Jan. 27, 2015, 5 pages.
Presentations at WinHEC 2000, May 2000, 138 pages.
Sonos Developer Portal—DeviceLink Authentication Mode, Oct. 14, 2014, 6 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 http://manuals.info.apple.com/MANUALS/0/MA403/en_US/AppleTV_SetupGuide.pdf Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action dated Apr. 22, 2021, issued in connection with U.S. Appl. No. 16/372,014, filed Apr. 1, 2019, 3 pages.
Advisory Action dated Apr. 30, 2018, issued in connection with U.S. Appl. No. 14/330,754, filed Jul. 14, 2014, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1 0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Jun. 18, 2020, issued in connection with European Application No. 20166880.3, 9 pages.
European Patent Office, European Office Action dated Apr. 29, 2019, issued in connection with European Application No. 15823218. 1, 7 pages.
European Patent Office, Search Report dated Jun. 30, 2017, issued in connection with European Patent Application No. 15822232.2, 8 pages.
Final Office Action dated Jan. 15, 2021, issued in connection with U.S. Appl. No. 16/372,014, filed Apr. 1, 2019, 15 pages.
Final Office Action dated Jan. 26, 2017, issued in connection with U.S. Appl. No. 14/330,754, filed Jul. 14, 2014, 18 pages.
Final Office Action dated Aug. 29, 2019, issued in connection with U.S. Appl. No. 16/142,895, filed Sep. 26, 2018, 9 pages.
Final Office Action dated Nov. 3, 2018, issued in connection with U.S. Appl. No. 14/330,754, filed Jul. 14, 2014, 18 pages.
Final Office Action dated Feb. 4, 2019, issued in connection with U.S. Appl. No. 14/330,754, filed Jul. 14, 2014, 18 pages.
Final Office Action dated Nov. 4, 2020, issued in connection with U.S. Appl. No. 16/700,676, filed Dec. 2, 2019, 28 pages.
Hardt. The OAuth 2.0 Authorization Framework. Internet Engineering Task Force, Microsoft, Oct. 2012, 77 pages.
International Bureau, International Preliminary Report on Patentability, dated Jul. 10, 2014, issued in connection with International Application No. PCT/US2012/071212, filed Dec. 21, 2012, 8 pages.
International Searching Authority, International Preliminary Report on Patentability dated Jan. 26, 2017, issued in connection with International Application No. PCT/US2015/040347, filed on Jul. 14, 2015, 8 pages.
International Searching Authority, International Search Report and Written Opinion dated Mar. 30, 2016, issued in connection with International Application No. PCT/US2015/061904, filed on Nov. 20, 2015, 12 pages.
International Searching Authority, International Search Report and Written Opinion dated Nov. 4, 2015, issued in connection with International Application No. PCT/US2015/040347, filed on Jul. 14, 2015, 11 pages.
International Searching Authority, International Search Report dated Sep. 30, 2013, issued in connection with International Patent Application No. PCT/US2013/046383, filed on Jun. 18, 2013, 3 pages.
International Searching Authority, Written Opinion dated Sep. 30, 2013, issued in connection with International Patent Application No. PCT/US2013/046383, filed on Jun. 18, 2013, 7 pages.
Jo et al., "Synchronized One-to-many Media Streaming with Adaptive Playout Control," Proceedings of SPIE, 2002, pp. 71-82, vol. 4861.

(56) References Cited

OTHER PUBLICATIONS

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 1, 2020, issued in connection with U.S. Appl. No. 16/700,676, filed Dec. 2, 2019, 25 pages.
Non-Final Office Action dated Jun. 10, 2021, issued in connection with U.S. Appl. No. 16/372,014, filed Apr. 1, 2019, 10 pages.
Non-Final Office Action dated Jun. 18, 2018, issued in connection with U.S. Appl. No. 14/330,754, filed Jul. 14, 2014, 17 pages.
Non-Final Office Action dated Aug. 19, 2016, issued in connection with U.S. Appl. No. 14/330,754, filed Jul. 14, 2014, 19 pages.
Non-Final Office Action dated Feb. 19, 2021, issued in connection with U.S. Appl. No. 16/700,676, filed Dec. 2, 2019, 19 pages.
Non-Final Office Action dated Jun. 22, 2017, issued in connection with U.S. Appl. No. 14/330,754, filed Jul. 14, 2014, 15 pages.
Non-Final Office Action dated Mar. 24, 2021, issued in connection with U.S. Appl. No. 16/773,280, filed Jan. 27, 2020, 13 pages.
Non-Final Office Action dated Sep. 29, 2020, issued in connection with U.S. Appl. No. 16/372,014, filed Apr. 1, 2019, 11 pages.
Non-Final Office Action dated Apr. 3, 2018, issued in connection with U.S. Appl. No. 15/876,928, filed Aug. 22, 2018, 8 pages.
Non-Final Office Action dated Jun. 3, 2021, issued in connection with U.S. Appl. No. 17/146,141, filed Jan. 11, 2021, 15 pages.
Non-Final Office Action dated Apr. 30, 2019, issued in connection with U.S. Appl. No. 16/142,895, filed Sep. 26, 2018, 14 pages.
Non-Final Office Action dated Mar. 31, 2020, issued in connection with U.S. Appl. No. 16/372,014, filed Apr. 1, 2019, 10 pages.
Notice of Allowance dated Aug. 2, 2021, issued in connection with U.S. Appl. No. 17/146,141, filed Jan. 11, 2021, 7 pages.
Notice of Allowance dated Aug. 3, 2021, issued in connection with U.S. Appl. No. 16/700,676, filed Dec. 2, 2019, 9 pages.
Notice of Allowance dated Sep. 7, 2021, issued in connection with U.S. Appl. No. 16/372,014, filed Apr. 1, 2019, 9 pages.
Notice of Allowance dated Sep. 15, 2017, issued in connection with U.S. Appl. No. 14/606,162, filed Jan. 27, 2015, 10 pages.
Notice of Allowance dated Sep. 24, 2019, issued in connection with U.S. Appl. No. 16/142,895, filed Sep. 26, 2018, 5 pages.
Notice of Allowance dated Aug. 31, 2018, issued in connection with U.S. Appl. No. 15/876,928, filed Jan. 22, 2018, 7 pages.
Notice of Allowance dated Aug. 8, 2019, issued in connection with U.S. Appl. No. 14/330,754, filed Jul. 14, 2014, 9 pages.
Notice of Allowance dated Jun. 8, 2021, issued in connection with U.S. Appl. No. 16/773,280, filed Jan. 27, 2020, 7 pages.
Palm, Inc., "Handbook for the Palm VII Handheld," May 2000, 311 pages.

* cited by examiner

MANAGING APPLICATION ACCESS OF A MEDIA PLAYBACK SYSTEM

CROSS REFERENCE TO RELATED APPLICATIONS

The present application is a continuation of U.S. application Ser. No. 16/700,676, titled "Managing Application Access of a Media Playback System," filed Dec. 2, 2019, and currently pending; U.S. application Ser. No. 16/700,676 is a continuation of U.S. application Ser. No. 14/330,754, titled "Managing Application Access of a Media Playback System," filed Jul. 14, 2014, and issued as U.S. Pat. No. 10,498,833 on Dec. 3, 2019. The entire contents of the Ser. Nos. 16/700,676 and 14/330,754 applications are incorporated herein by reference.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
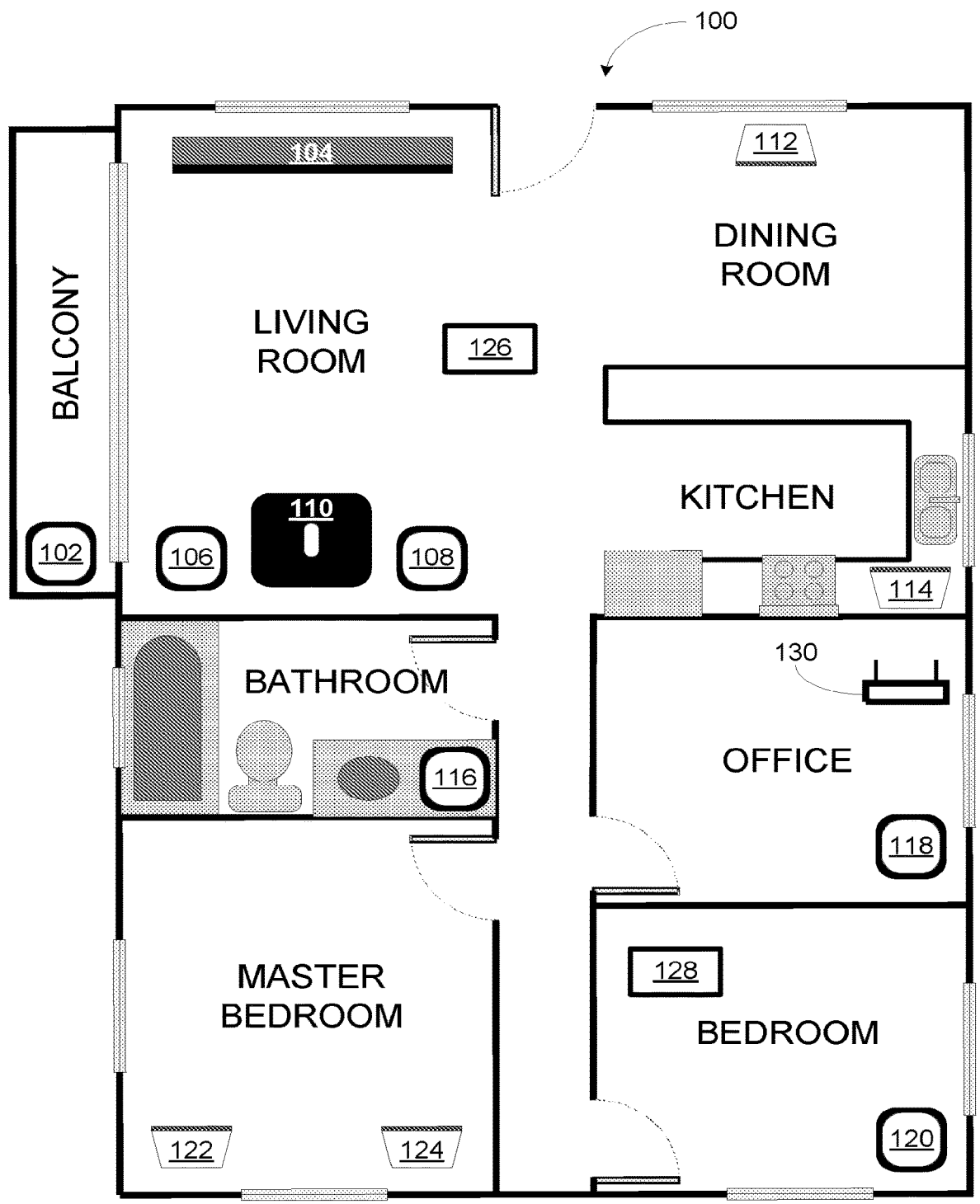
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In examples herein, protocols via which a media application may request and receive certifications for accessing and managing a media playback system are provided. The media application may be an application provided by a service provider via which media content from the service provider may be accessed. For instance, the media application may be a third party application rather than a native controller application that is dedicated to the media playback system. As such, the protocols may include comparing the application's operation performance to various quality-control metrics or benchmarks to determine whether the application should be allowed to access one or more media playback systems. If the application's performance is determined to satisfy the quality-control metrics or benchmarks, the application may be provided certification data that allows the application to access or control the one or more media playback devices.

In some examples, media playback systems may be controlled by a control device. In some situations the control device may run a controller application that is dedicated to the media playback system. In other situations, the control device may be a device that operates independent of the media playback system. Such a device may include a smartphone, tablet computer, or the like. As such, the device may include a media application that at times may operate to obtain media independent of the media playback system, while at other times the media application may operate as a controller application for the media playback system.

In some contexts, it may be desirable for the manufacturer of the media playback system to dictate or otherwise monitor what media applications may be used to control the media playback system. That is, it may be desirable for the manufacturer to enforce a form of quality-control over applications that may be used to control its media playback systems.

In practice, before a media application may be used to control a media playback system, the media application may first be evaluated to ensure that it meets certain quality-control metrics. (A media application may be referred to herein as a controller application when the media application is used to control a media playback system.) For example, a computing device associated with an entity involved in developing and/or distributing a media application (e.g. a media service provider or an independent application developer) may send to a media system server a request for a validation-key. The request may identify the media application. The media system server may be associated with and communicatively coupled to one or more media playback systems. Based on the received information, the server may determine that the media application meets at least one quality-control metric. (In some cases, the media application may undergo testing and/or certification procedures to determine that the media application meets the at least one quality-control metric.) The server may send to the computing device a validation-key that includes (i) an application identifier corresponding to the media application and/or (ii) a system identifier corresponding to the media playback system.

The computing device may subsequently provide the validation-key to a control device configured to run the media application to control the media playback system. Then, the control device may send the validation-key to the media playback system (e.g., a playback device of the media playback system) and receive from the media playback system a session identifier corresponding to a playback device of the media playback system. The session identifier may enable the control device to manage, to some extent, media playback of media content by the playback device.

After the control device receives the session identifier, the control device may send to the media playback system a playback request that includes the session identifier and a playback command. If the session identifier provided by the control device is valid, the media playback system may carry out the playback command (e.g., load a playback queue of the playback device for playback of one or more media items).

In one aspect, a method is provided. The method involves receiving, by a playback device of a media playback system, a validation-key, wherein the validation-key comprises an application identifier corresponding to a controller application through which one or more media items are added to a playback queue; based on at least the application identifier, creating a session identifier corresponding to the playback device; transmitting the session identifier; receiving a playback request comprising (i) the session identifier and (ii) a playback command indicating a command related to playback of media by the playback device; determining that the received session identifier is valid; and based on determining that the received session identifier is valid, executing the playback command.

In yet another aspect, a non-transitory computer-readable medium is provided. The non-transitory computer-readable medium has stored thereon instructions executable by a playback device to cause the playback device to perform functions. The functions include receiving a validation-key, wherein the validation-key comprises an application identifier corresponding to a controller application through which one or more media items are added to a playback queue; based on at least the application identifier, creating a session identifier corresponding to the playback device; transmitting the session identifier; receiving a playback request comprising (i) the session identifier and (ii) a playback command indicating a command related to playback of media by the playback device; determining that the received session identifier is valid; and based on determining that the received session identifier is valid, executing the playback command.

In another aspect, a playback device is provided. The playback device includes a processor and a non-transitory computer-readable medium storing instructions that when executed by the playback device cause the playback device to perform functions comprising: receiving a validation-key, wherein the validation-key comprises an application identifier corresponding to a controller application through which one or more media items are added to a playback queue; based on at least the application identifier, creating a session identifier corresponding to the playback device; transmitting the session identifier; receiving a playback request comprising (i) the session identifier and (ii) a playback command indicating a command related to playback of media by the playback device; determining that the received session identifier is valid; and based on determining that the received session identifier is valid, executing the playback command.

In another aspect, the disclosure includes a method that includes transmitting, by a computing device communicatively coupled to a media playback system, a validation-key, wherein the validation-key comprises an application identifier corresponding to a controller application through which one or more media items are added to a playback queue; thereafter, receiving a session identifier corresponding to a playback device of the media playback system; and transmitting a playback request comprising (i) the session identifier and (ii) a playback command indicating a command related to playback of media by the playback device.

In yet another aspect, a non-transitory computer-readable medium is provided. The non-transitory computer-readable medium has stored thereon instructions executable by a computing device communicatively coupled to a media playback system to cause the computing device to perform functions. The functions include transmitting a validation-key, wherein the validation-key comprises an application identifier corresponding to a controller application through which one or more media items are added to a playback queue; thereafter, receiving a session identifier corresponding to a playback device of the media playback system; and transmitting a playback request comprising (i) the session identifier and (ii) a playback command indicating a command related to playback of media by the playback device.

In yet another aspect, a computing device is provided. The computing device includes a processor and a non-transitory computer-readable medium storing instructions that when executed by the computing device cause the computing device to perform functions comprising: transmitting a validation-key, wherein the validation-key comprises an application identifier corresponding to a controller application through which one or more media items are added to a playback queue; thereafter, receiving a session identifier corresponding to a playback device of the media playback system; and transmitting a playback request comprising (i) the session identifier and (ii) a playback command indicating a command related to playback of media by the playback device.

In another aspect, the disclosure includes a method that comprises receiving, by a computing system communicatively coupled to a media playback system, a validation-key request comprising identification information related to a controller application through which one or more media items are added to a playback queue; determining that the controller application meets at least one quality-control metric; based on determining that the controller application meets the at least one quality-control metric, generating a validation-key, wherein the validation-key comprises an application identifier corresponding to the application; and transmitting a certification message indicating that the controller application meets the at least one quality-control metric, wherein the certification message comprises the validation-key.

In yet another aspect, a non-transitory computer-readable medium is provided. The non-transitory computer-readable medium has stored thereon instructions executable by a computing device communicatively coupled to a media playback system to cause the computing device to perform functions. The functions include receiving a validation-key request comprising identification information related to a controller application through which one or more media items are added to a playback queue; determining that the controller application meets at least one quality-control metric; based on determining that the controller application meets the at least one quality-control metric, generating a validation-key, wherein the validation-key comprises an application identifier corresponding to the application; and transmitting a certification message indicating that the controller application meets the at least one quality-control metric, wherein the certification message comprises the validation-key.

In yet another aspect, a computing device communicatively coupled to a media playback system is provided. The computing device includes a processor and a non-transitory computer-readable medium storing instructions that when executed by the computing device cause the computing device to perform functions comprising: receiving a validation-key request comprising identification information related to a controller application through which one or more media items are added to a playback queue; determining that the controller application meets at least one quality-control metric; based on determining that the controller application meets the at least one quality-control metric, generating a validation-key, wherein the validation-key comprises an application identifier corresponding to the application; and transmitting a certification message indicating that the controller application meets the at least one quality-control metric, wherein the certification message comprises the validation-key.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
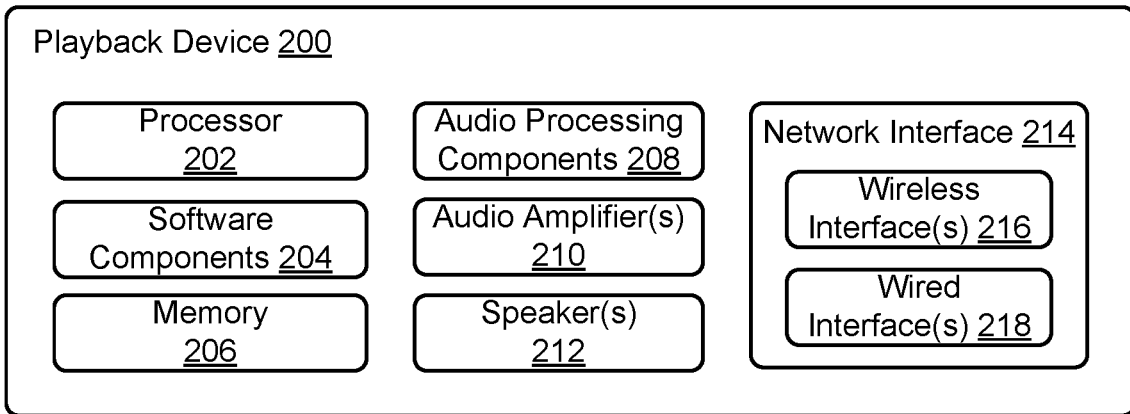
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
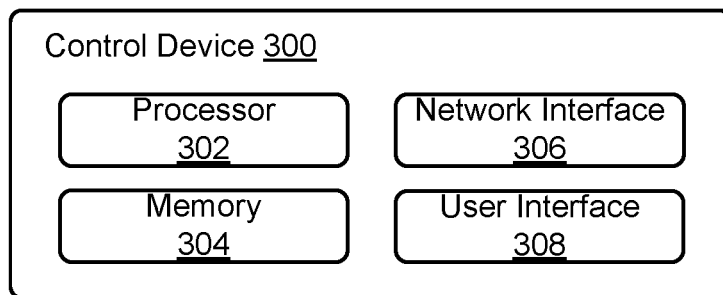
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
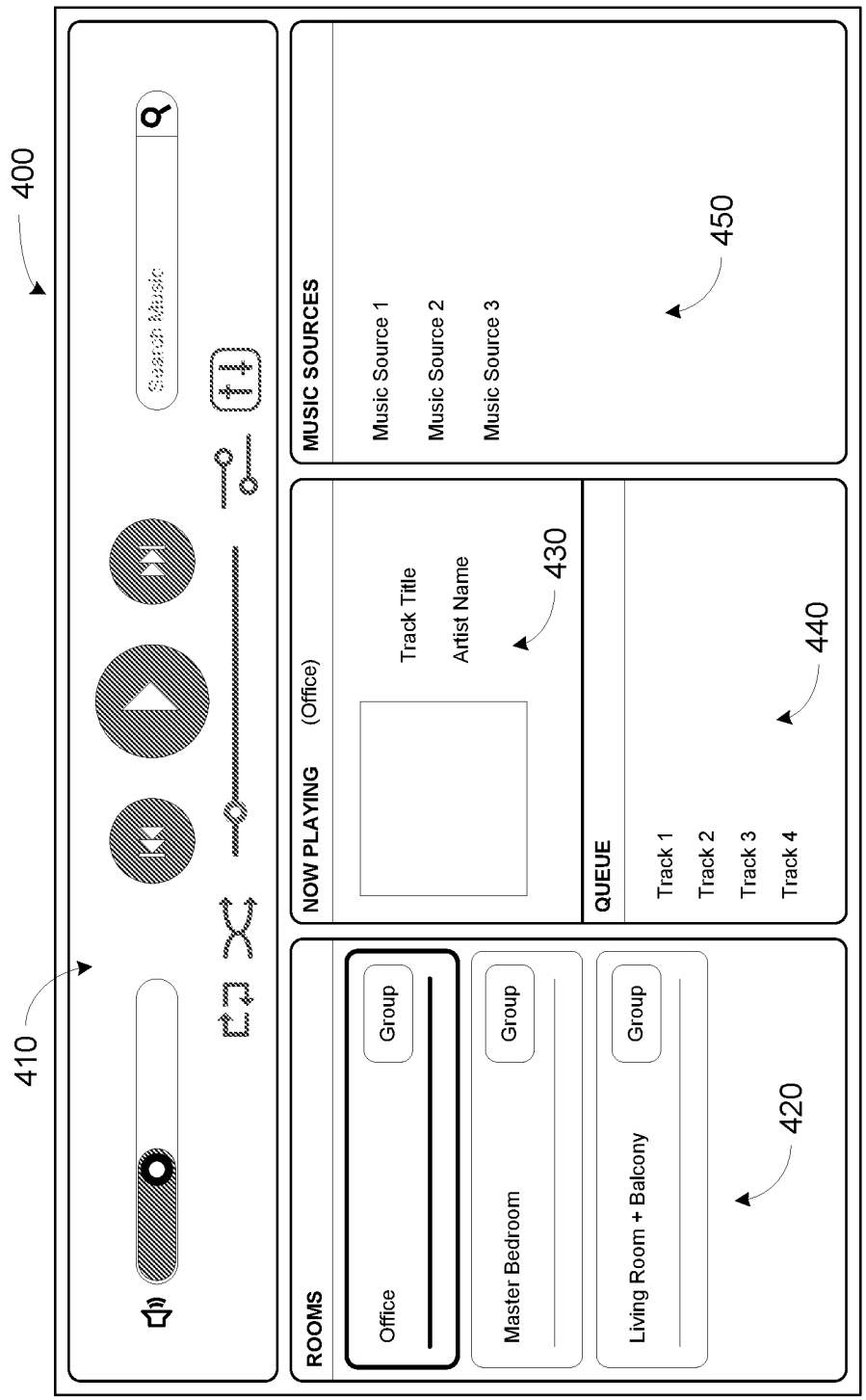
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be re-associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 8:
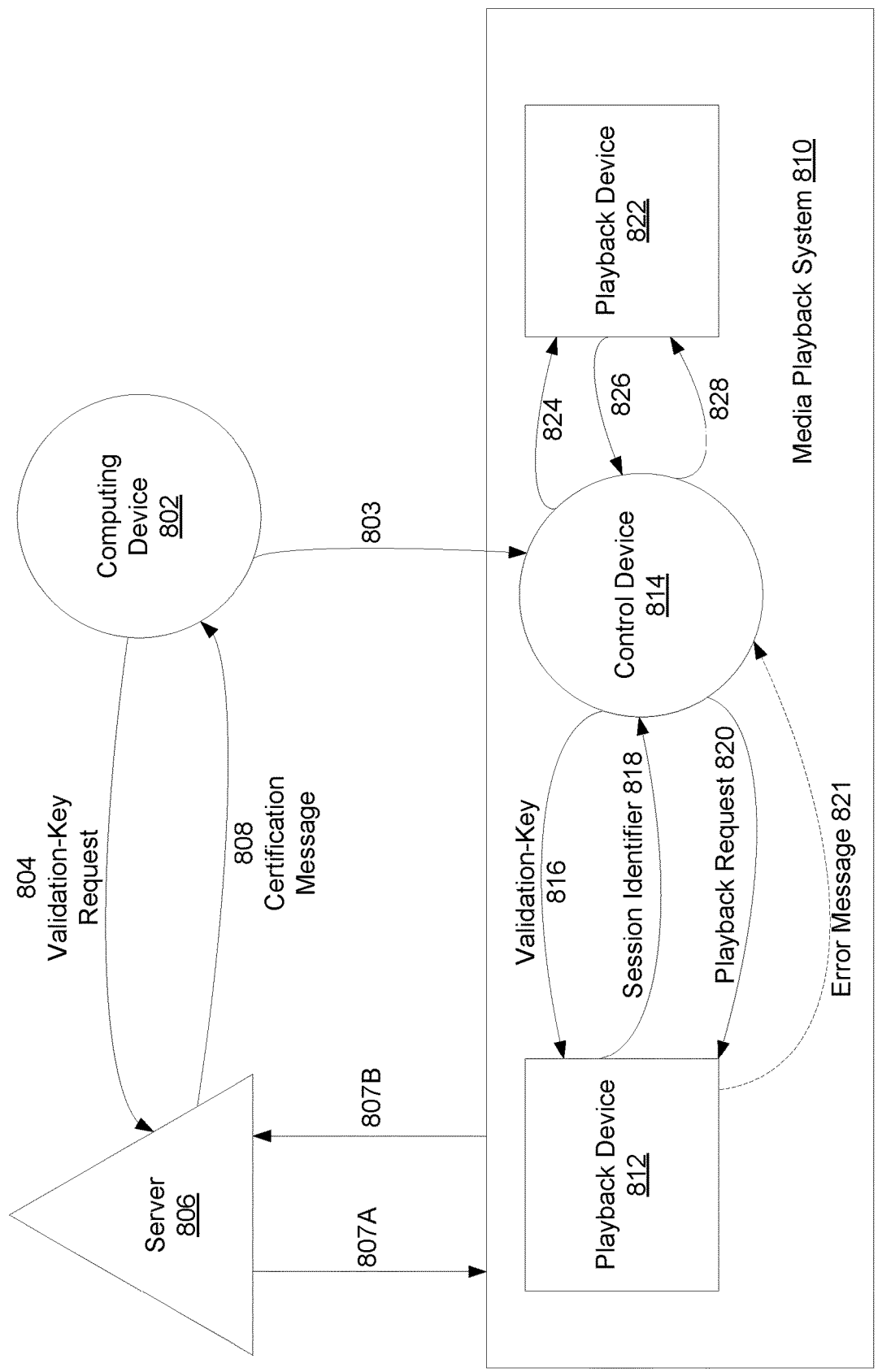
FIG. 8 shows an example network configuration.

III. Methods and Systems for Managing Application Access of a Media Playback System In example implementations, a server may maintain a list (or lists) of controller applications that are (or are not) approved to control one or more media playback devices. To illustrate, FIG. 8 shows an example network configuration that includes a computing device 802, a server 806, messages 807A and 807B, and a media playback system 810 that includes a playback device 812, a playback device 822, and a control device 814. It should be understood that the network configuration may include multiple instances of the aforementioned network elements and/or may include additional network elements not shown.

In various examples, the server 806 may be associated with the media playback system 810. For instance, the server 806 may maintain data for an entity or person (e.g., a designer or manufacturer of the media playback system 810) facilitating third-party controller application access to media playback systems such as the media playback system 810. The computing device 802 may be associated with an entity or person (e.g., a media service provider) developing or marketing a controller application for use with media playback systems such as the media playback system 810.

The server 806 may be communicatively coupled to the media playback system 810 and may store and maintain data identifying one or more controller applications that are authorized to access or control the media playback system 810 and/or data representing one or more controller applications that are not authorized to access or control the media playback system 810. For instance, the server 806 may store a "whitelist" that includes validation-keys and/or other data that corresponds to the one or more controller applications that are allowed to access or control the media playback system 810. Additionally or alternatively, the server 806 may store a "blacklist" that includes validation-keys and/or other data that represents one or more controller applications that are not allowed to access or control the media playback system 810.

The server 806 may (perhaps daily or otherwise periodically) update data stored at the server 806 regarding controller applications and refresh the "blacklist" and/or "whitelist" and (perhaps daily or otherwise periodically) send the "blacklist" and/or "whitelist" as part of the message 807A to the media playback system 810 (e.g., playback device 812). The message 807A may also be sent based on the server 806 detecting data being added to or removed from the "blacklist" or "whitelist." The media playback system 810 may allow or not allow various controller applications to access or control the media playback system 810 based on the contents of the "blacklist" and/or "whitelist."

The server 806 may also store and maintain usage data related to one or more controller applications that are used to control the media playback system 810 and/or other media playback systems (not shown). For example, the control device 814 may run a controller application to control the playback device 812, and the playback device 812 or the control device 814 may send, as part of the message 807B, usage data related to the use of the controller application to control the playback device 812.

In general, the usage data may indicate that a particular controller application was used to control a media playback system. In some implementations, such usage data may identify the number of occurrences or perhaps the duration of time that a given controller application was used to control a media playback system. In some examples, the usage data may indicate other information related to a controller application. For instance, the usage data may include information such as (i) a source of media streamed by the media playback system 810 or (ii) characterizations of playback commands that the controller application causes the media playback system 810 to perform. For example, the usage data may indicate that the controller application caused the media playback system 810 to stream media from a first media service provider (i.e., a data storage location corresponding to the first media service provider) and that the controller application caused media items to be added to a playback queue of the playback device 812.

Figure 5:
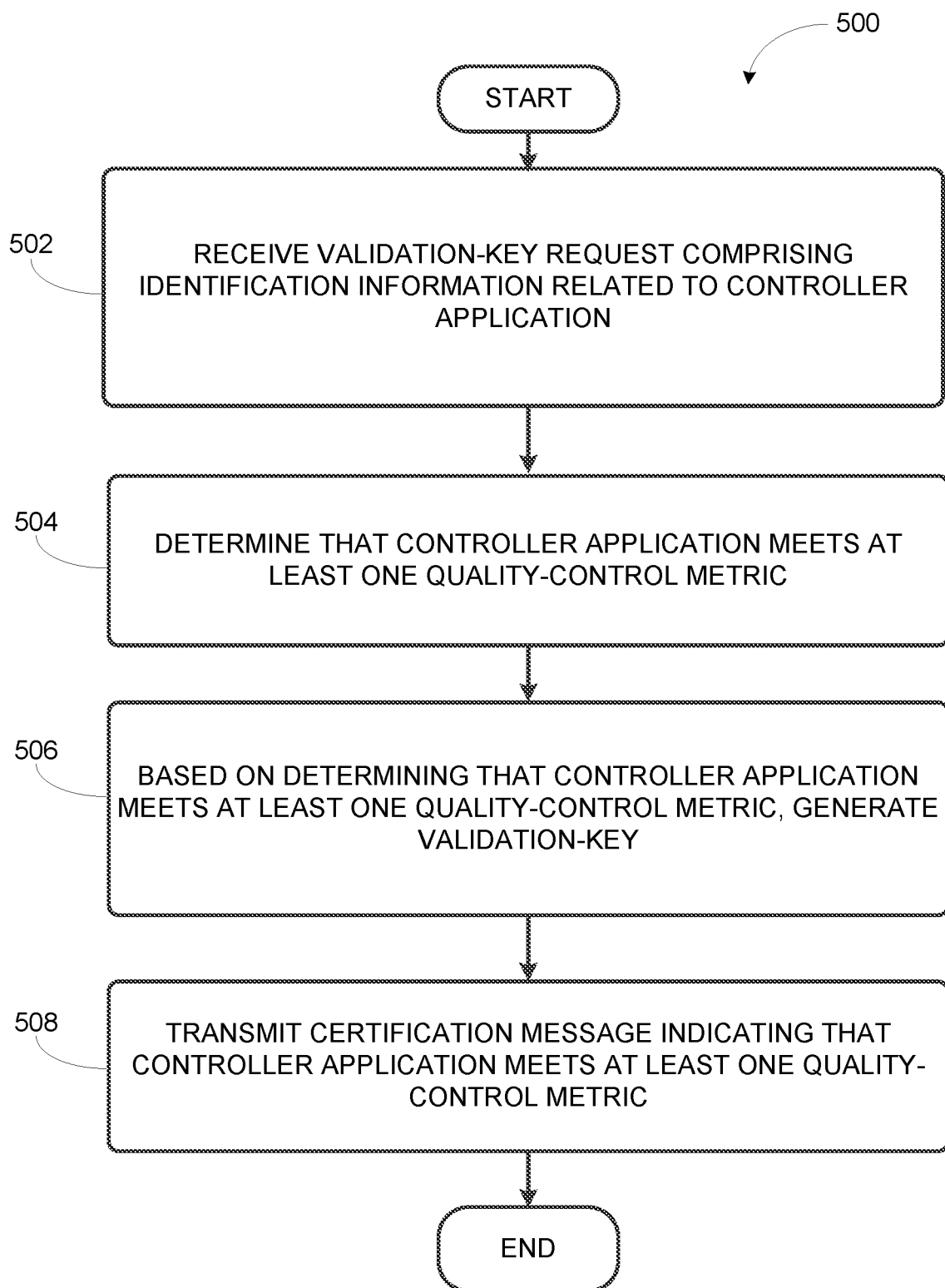
FIG. 5 shows an example flow diagram of an example method.
Figure 9:
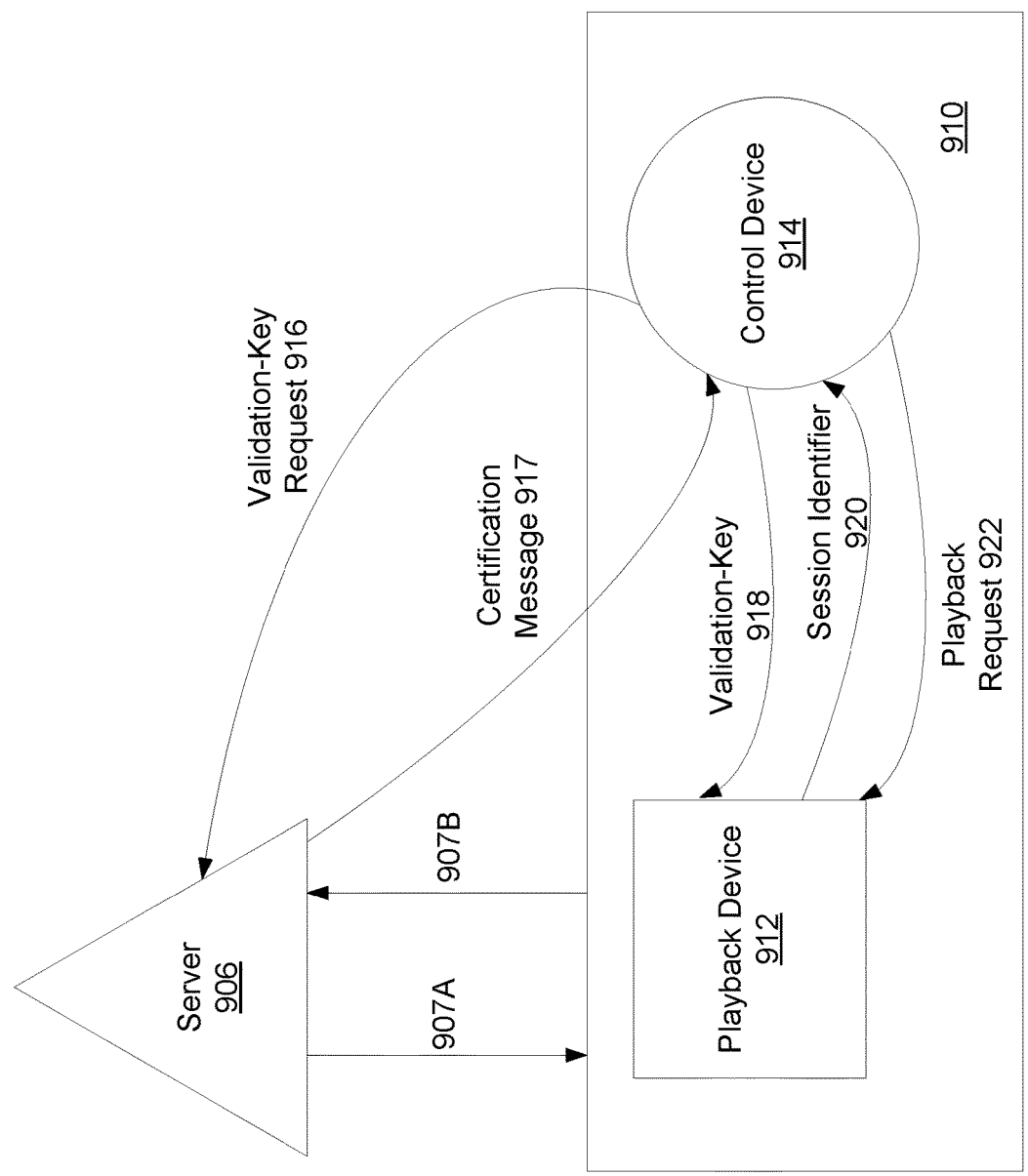
FIG. 9 shows another example network configuration.

Referring now to FIG. 5, method 500 presents an example method that may be implemented within an operating environment involving, for example, the media playback system 100 of FIG. 1, one or more of the playback device 200 of FIG. 2, one or more of the control device 300 of FIG. 3, or any of the devices depicted in FIGS. 8 and 9. Method 500 may include one or more operations, functions, or actions as illustrated by one or more of blocks 502-508.

In addition, for the methods 500, 600, 700 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500, 600, 700 and other processes and methods disclosed herein, each block shown in the FIGS. 5, 6, and 7 may represent circuitry that is wired to perform the specific logical functions in the process. Moreover, although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 502, the method 500 includes receiving, by a computing system communicatively coupled to a media playback system, a validation-key request including identification information related to a controller application through which one or more media items are added to a playback queue.

For example, referring back to FIG. 8, the server 806 may receive a validation-key request 804 from the computing device 802. The computing device 802 may be associated with persons or an entity involved in developing and/or distributing the controller application. The computing device 802 may send the validation-key request 804 to the server 806 so that the computing device 802 may subsequently provide a validation-key to one or more control devices configured to use the controller application to control the media playback system 810. For example, the control device 814 may be configured to download the controller application (i.e., data 803) from the computing device 802 (or another computing device that is at some point communicatively coupled to the computing device 802) and the validation-key may be embedded or loaded on the control device 814 as part of the installed controller application.

In another example shown in FIG. 9, a server 906 may receive a validation-key request 916 from a control device 914 and send a certification message 917 that includes the validation-key to the control device 914, without a computing device such as the computing device 802 of FIG. 8 serving as an intermediary between the server 906 and the control device 914.

Further, the control device 914 may receive, from the server 906, the certification message 917 that includes the validation-key (perhaps as part of a download of the controller application), but the server 906 may subsequently send one or more new validation keys to the playback device 912 to use for validating controller applications attempting to control the playback device 912. This may render the validation-key previously received by the control device 914 invalid or out of date. In this case, the control device 914 may receive, from the server 906, a new validation-key that the playback device 912 may recognize as valid. Based on receiving the new validation-key from the control device 914, the playback device 912 may send, to the control device 914, a valid session identifier.

Referring back to FIG. 8, the validation-key request 804 may comprise identification information related to the controller application configured to be installed on the control device 814 of the media playback system 810. For example, the identification information related to the controller application may include contact information of one or more parties involved in development and/or distribution of the controller application, names of one or more companies associated with the controller application, a name of the controller application, or other identification information.

The computing device 802 may send the validation-key request 804, at least in part, to receive a validation key within the certification message 808 so that the validation key may be provided to the control device 814 (perhaps during a download of the controller application by the control device 814 from the computing device 802). Once the controller application being executed by the control device 814 has access to the validation key, the control device 814 may be used to add one or more media items to a playback queue of the playback device 812 (or playback device 822). The controller application may also be used to cause other modifications to the playback queue. In this way, the controller application may be used to customize a media playback experience provided by the playback device 812 and/or the playback device 822. Also, after the control device 814 has been initially validated to control the playback device 812, the control device 814 may receive updated validation-key(s) from the server 806 (perhaps as part of a certification message 917 as depicted in FIG. 9).

Referring again to FIG. 5, at block 504 the method 500 includes determining that the controller application meets at least one quality-control metric. For example, the server 806 of FIG. 8 may retrieve data stored in a memory of the server 806 that indicates that the controller application meets the at least one quality-control metric. The server 806 may be periodically updated with such data indicating controller applications that may or may not meet various quality-control metrics. For instance, data indicating controller applications that meet the at least one quality-control metric may be stored in a "whitelist" within memory of the server 806 whereas data indicating controller applications that do not meet the at least one quality-control metric may be stored in a "blacklist" within memory of the server 806.

For example, the server 806 may, perhaps on a real-time basis, collect usage data from several media playback systems. The usage data may be indicative of whether a given controller application being used to control multiple media playback systems continues to meet the at least one quality-control metric. For example, the at least one quality-control metric may include whether the controller application is operating according to a terms of service agreement or whether the controller application is operating in a sufficiently predictable and reliable manner. If the received usage data indicates such a failure of the controller application to meet the at least one quality-control metric, the server 806 may place the controller application on the "blacklist." In a similar manner, if the usage data indicates that a controller application previously placed on the "blacklist" has begun to meet the at least one quality-control metric, the server 806 may place the controller application on the "whitelist."

In some examples, the validation-key request 804 may include results of a diagnostic procedure designed to show whether the controller application meets the at least one quality-control metric. For example, a control device executing the controller application may execute a background application (perhaps downloaded from the server 806 or computing device 802) that collects data related to reliability and predictability of the ongoing operation of the controller application being used to control a media playback system. Through the background application, the control device may provide the diagnostic data to the server 806. The server 806 may have stored data representing minimum "scores" or diagnostic results that represent a controller application that meets the at least one quality-control metric. The server 806 may use the stored data as a point of comparison to determine whether the controller application is meeting the at least one quality-control metric.

The at least one quality-control metric may include metrics such as reliability, predictability, functionality, and security, among others. For example, a first controller application may be prone to "crashing" or entering a race condition in which the computing device running the first controller application may become unresponsive to inputs, a second controller application may have security vulnerabilities, a third controller application may not respond consistently to certain inputs, but a fourth controller application may be generally robust and reliable. In such a situation, it may be beneficial to allow the fourth controller application to control or access the media playback system 810 while preventing the first, second, and third controller applications from controlling or accessing the media playback system 810.

Referring again to FIG. 5, at block 506 the method 500 includes based on determining that the controller application meets the at least one quality-control metric, generating a validation-key, where the validation-key includes (i) an application identifier corresponding to the application, and/or (ii) a system identifier corresponding to the media playback system. In some instances, both "native" controller applications associated with the media playback system 810 (e.g., a controller application represented by controller interface 400 of FIG. 4) and media applications acting as controller applications may be required to use a validation-key to gain access or control of the media playback system 810. The validation-key may be generated by the server 806 and may include arbitrarily or randomly generated data so that the validation-key is not easily compromised using brute force password cracking methods. Generally, the validation-key may include any data that identifies the controller application and the media playback system 810. For example, the application identifier may include any data string that may be used to identify the controller application, such as "App10V2.1." The system identifier may include any data string that may be used to identify the media playback system 810 such as "SystemX," so that the validation-key is perhaps "App10V2.1.SystemX." The system identifier may also generically identify a given make and/or model of media playback system as opposed to identifying a specific instance of a media playback system.

The validation-key may also include data that identifies an expiration time for the validation-key or an operating system or platform with which the controller application is configured to interact with. For instance, a validation-key that includes an expiration time that has already elapsed may be rejected by the media playback system 810. In other instances, the validation-key may be associated with the expiration time at the playback device 802. For example, data representing the validation-key and the expiration time associated with the validation-key may be stored at the playback device 812 (or at a location accessible to the playback device 812), perhaps within a common row or column of a data table.

In some examples, the controller application may be in a testing or development stage, perhaps meaning that a person or entity associated with the controller application desires to use the controller application to access and/or control the media playback system 810 in order to test or debug the controller application. Before generating the validation-key, the server 806 may determine (perhaps based on contents of the validation-key request 804) that the controller application is in a development state and based on determining that the controller application is in the development state, assign an in-development indicator to the application identifier. The in-development indicator may be included in the validation-key (i.e., the application identifier) and include any data string that indicates that the controller application identified by the application identifier is in a development stage (e.g., "betav2.2").

In some examples, the in-development indicator may correspond to a privilege to access or control a first playback device but not a second playback device. For example, the first playback device may receive from a control device a validation-key (i.e., an application identifier) that includes the in-development indicator and, in response, allow the controller application to cause the control device to control the first playback device. In contrast, the second playback device may receive from the control device the validation-key that includes the in-development indicator and, in response, prevent the controller application from causing the control device to control the second playback device. Here, the validation-key that includes the in-development indicator may also include data specifically indicating playback devices (e.g., via serial number etc.) that the controller application in development is allowed to control.

As shown in FIG. 5, at block 508 the method 500 includes transmitting a certification message indicating that the controller application meets the at least one quality-control metric, where the certification message includes the validation-key. For example, at FIG. 8, certification message 808 may include any data that includes the validation-key and indicates, to the computing device 802 (or the control device 814), that the controller application meets the at least one quality-control metric. The certification message 808 may include a textual message indicating that the controller application meets the at least one quality-control metric. In some examples, the computing device 802 may send the validation-key to the control device 814, perhaps as part of a download of the controller application to the control device 814, so that the control device 814 may control the media playback system 810. That is, the validation-key may be embedded within program instructions of the controller application that is configured to run on the control device 814.

Sometime after transmitting the certification message 808, the server 806 may determine that the controller application has subsequently failed the at least one quality-control metric or perhaps one or more other quality-control metrics. For example, usage data regarding the controller application may be sent by the media playback system 810 within message 807B that is gathered and stored by the server 806, and based on the usage data, the server 806 may determine that the controller application has failed the at least one quality-control metric and should not be allowed to access or control the media playback system 810. The server 806 may store the application identifier corresponding to the controller application that failed the at least one quality-control metric on an unauthorized list (e.g., a "blacklist") that may include other application identifiers that correspond to other respective controller applications that are not authorized to control one or more playback devices. Other examples are also possible.

The server 806 may periodically transmit or send the unauthorized list of controller applications to the media playback system 810 as part of message 807A. For example, the server 806 may transmit the unauthorized list to the playback device 812 (or otherwise transmit the unauthorized list to the media playback system 810) after a predetermined amount of time elapses (i.e., periodically) or based on detecting that the contents of the unauthorized list have been refreshed, modified or changed (e.g., adding or removing an application identifier). The server 806 may also periodically send a list of controller applications that meet the at least one quality-control metric (e.g., a "whitelist") to the media playback system 810 based on a predetermined amount of time elapsing or based on the contents of the authorized list or "whitelist" being refreshed or changed.

Figure 6:
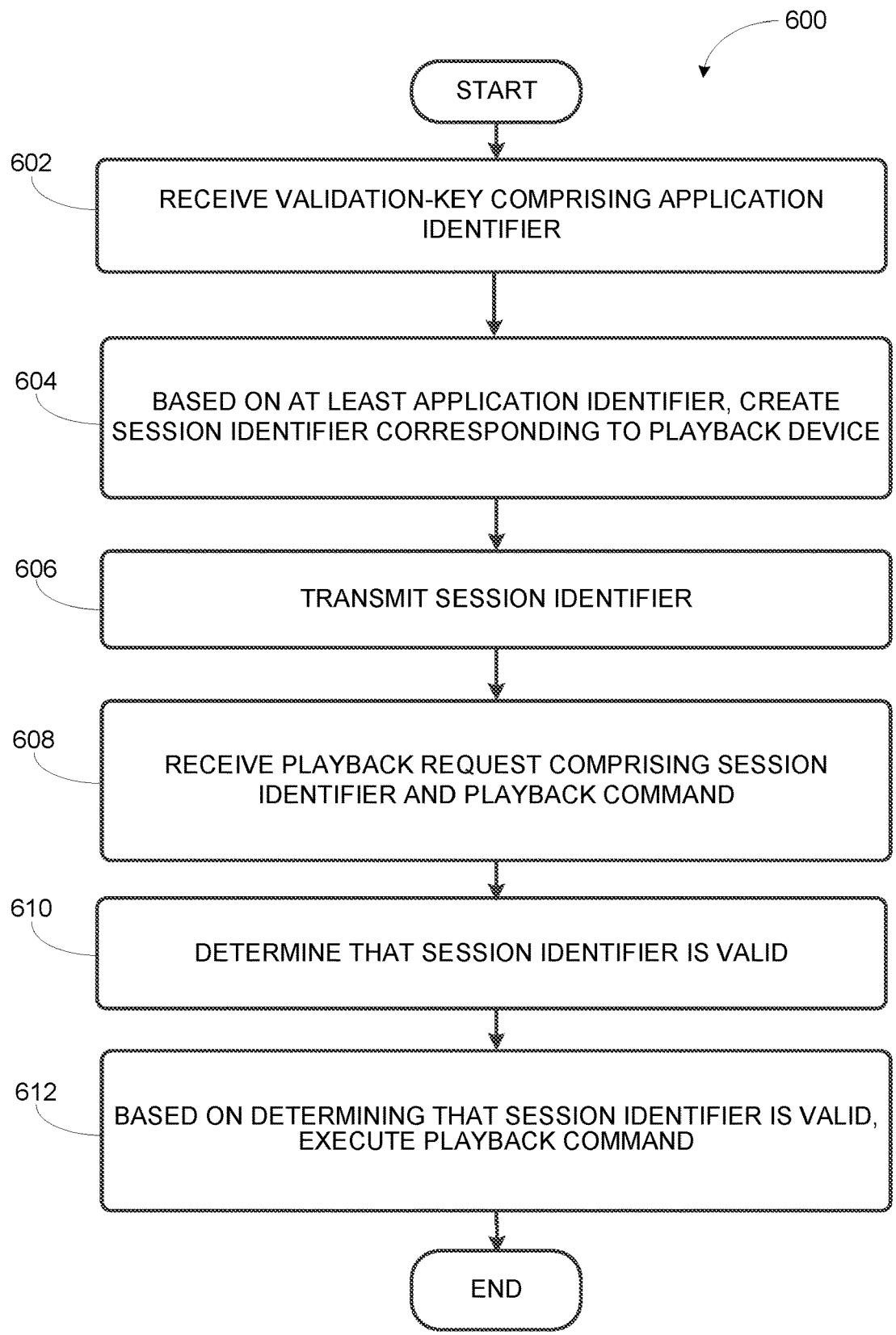
FIG. 6 shows an example flow diagram of an example method.

Method 600 shown in FIG. 6 presents an example method that may be implemented within an operating environment involving, for example, the media playback system 100 of FIG. 1 and one or more of the playback device 200 of FIG. 2. Method 600 may include one or more operations, functions, or actions as illustrated by one or more of blocks 602-612.

Referring to FIG. 6, at block 602 the method 600 includes, receiving, by a playback device of a media playback system, a validation-key, where the validation-key includes (i) an application identifier corresponding to a controller application through which one or more media items are added to a playback queue and/or (ii) a system identifier corresponding to the media playback system.

For example, as shown in FIG. 8, the playback device 812 receives a validation-key 816 from the control device 814 of the media playback system 810. The validation-key 816 includes an application identifier such as a data string that identifies a controller application through which one or more media items are added to a playback queue of the playback device 812. The validation-key 816 also may include a system identifier such as a data string that corresponds to the media playback system 810 and/or generically corresponds to a given make and/or model of the playback system 810. That is, the validation-key 816 (if valid) may be accepted by other media playback systems similar to the media playback system 810 and allow a control device (e.g., similar to the control device 814) to control the other media playback systems as well. The validation-key 816 may be a validation key like the validation-key transmitted (at block 508 of FIG. 5) from the server 806 to the computing device 802 as part of the certification message 808.

Referring again to FIG. 6, at block 604 the method 600 includes, based on at least the application identifier, creating a session identifier corresponding to the playback device.

For example, the playback device 812 may create the session identifier 818, which may include a data string that represents a communication session that the control device 814 and the playback device 812 may establish via the controller application (e.g., "Session 313"). In some examples, the playback device 812 may create the session identifier based on (i) determining that the received application identifier matches an application identifier contained within an authorized list or "whitelist" of controller applications stored at the playback device 812 (or the server 806) and/or (ii) recognizing the received system identifier as a valid system identifier that corresponds to or is associated with the media playback system 810. In cases where the media playback system 810 is not communicatively coupled to the server 806, the playback device 812 may create the session identifier 818 based only on recognizing the system identifier as associated with the media playback system 810 or based on the contents of the locally stored "whitelist".

In another example, before creating the session identifier 818, the playback device 812 may receive and/or store an unauthorized list or "blacklist" that includes application identifiers that correspond to respective applications that are unauthorized to control one or more playback devices. The playback device 812 may determine that the received unauthorized list does not include the received application identifier, and based at least on determining that the unauthorized list does not include the received application identifier, create the session identifier 818. In this way, the playback device 812 may grant access to control devices by using either a "whitelist" or a "blacklist" to determine whether a control device should receive a valid session identifier.

In one example, the playback device 812 may determine that the system identifier perhaps received as part of the validation-key 816 matches a universal identifier corresponding to the media playback system 810 and one or more additional media playback systems (e.g., any media playback system of a common make and/or model). In one example, the universal identifier may include a data string that is shorter than a system identifier representing an individual media playback system. For instance, a system identifier representing a single media playback system may include a data string extension such as a serial number or another data string extension that identifies an individual media playback system, whereas the universal identifier may include no such data string extension (or a different data string extension). Other examples are possible. Based at least on determining that the system identifier perhaps received as part of the validation-key 816 matches the universal identifier, the playback device 812 may create the session identifier 818.

In another example, the validation-key 816 may include an expiration time and the playback device 812 may determine that the received validation-key 816 is received before the expiration time elapsed. The playback device 812 may then create the session identifier 818 based on determining that the received validation-key 816 was received before the expiration time elapsed. If the validation-key 816 is received after the expiration time elapses, the playback device 812 may not send a session identifier to the control device 814 and may instead send an error message 821 to the control device 814 indicating that the validation-key 816 is expired.

In other instances, the validation-key may be associated with the expiration time at the playback device 802. For example, data representing the validation-key and the expiration time associated with the validation-key may be stored at the playback device 812 (or at a location accessible to the playback device 812), perhaps within a common row or column of a data table.

After creating the session identifier 818, the playback device 812 may store the session identifier 818 and the received application identifier within memory such that the session identifier 818 is associated with the application identifier. For example, the session identifier 818 and the application identifier may be stored in a common row of a data table stored at the playback device 812.

Referring again to FIG. 6, at block 606 the method 606 includes transmitting the session identifier. For example, as shown in FIG. 8, the playback device 812 may transmit the session identifier 818 to the control device 814. The control device 814 may then use the session identifier 818 to control or access the playback device 812 (i.e., by sending a playback request 820 to the playback device 812). That is, in some examples, the playback device 812 may only execute received playback commands (e.g., commands to add items to a playback queue or to navigate the playback queue) that include a valid session identifier.

Referring back to FIG. 6, at block 608 the method 600 includes receiving a playback request including (i) the session identifier and (ii) a playback command indicating a command related to playback of media by the playback device. For example, as shown in FIG. 8, the playback device 812 may receive a playback request 820 from the control device 814. The playback request 820 may include the session identifier 818 and data indicating a command to alter a playback queue of the playback device 812, for example.

Referring to FIG. 6, at block 610 the method 600 includes determining that the session identifier is valid. The playback device 812 may determine that the session identifier received as part of the playback request 820 is valid by comparing the received session identifier to one or more session identifiers stored within a memory of the playback device 812. For instance, after creating a session identifier, the playback device 812 may store the created session identifier for future comparison to session identifiers received as part of received playback requests.

In one example, the session identifier 818 sent from the playback device 812 to the control device 814 may include an expiration time (e.g., 30 minutes after the session identifier 818 is generated) after which the session identifier 818 expires and is no longer valid. In such a circumstance, the playback device 812 may compare the expiration time included as part of the session identifier received as part of the playback request 820 to a current time. The playback device 812 may determine the received session identifier to be valid if the playback device 812 determines that the received session identifier was received before the expiration time elapsed.

In other instances, the session identifier may be associated with the expiration time at the playback device 802. For example, data representing the session identifier and the expiration time associated with the session identifier may be stored at the playback device 812, perhaps within a common row or column of a data table.

In another example, instead of sending an expiration time as part of the session identifier 818, the playback device 812 may store an expiration time within a data table so that the expiration time is associated with the session identifier 818. Then, a receipt time of a session identifier received with the playback request 820 may be compared to the stored expiration time to determine if the received session identifier is valid and if the playback command included in the playback request 820 should be performed by the playback device 812.

Referring again to FIG. 6, at block 612 the method 600 includes, based on determining that the session identifier is valid, executing the playback command. For instance, the playback command received as part of the playback request 820 may represent a command to skip a currently playing media item in the playback queue of the playback device 812 and the playback device 812 may accordingly skip the currently playing media item to play back a subsequent media item. In another example, the playback command received as part of the playback request 820 may include a command to add at least one media item to the playback queue. Accordingly, the playback device 812 may execute the playback command by adding the at least one media item to the playback queue.

After the playback device 812 determines that the session identifier received as part of the playback request 820 is valid and executes the playback command based on the determination, the playback device 812 may transmit reporting data within a message 807B (e.g., usage data related to the controller application) that includes identification information related to the controller application. For example, the playback device 812 may transmit data within the message 807B to the server 806. The data within the message 807B may include usage data corresponding to the controller application running on the control device 814. The usage data may include data related to sources of media content played back by the playback device 812 in response to playback requests 820 sent using the controller application or data indicating a history of playback commands included in playback requests 820 sent using the controller application.

Figure 7:
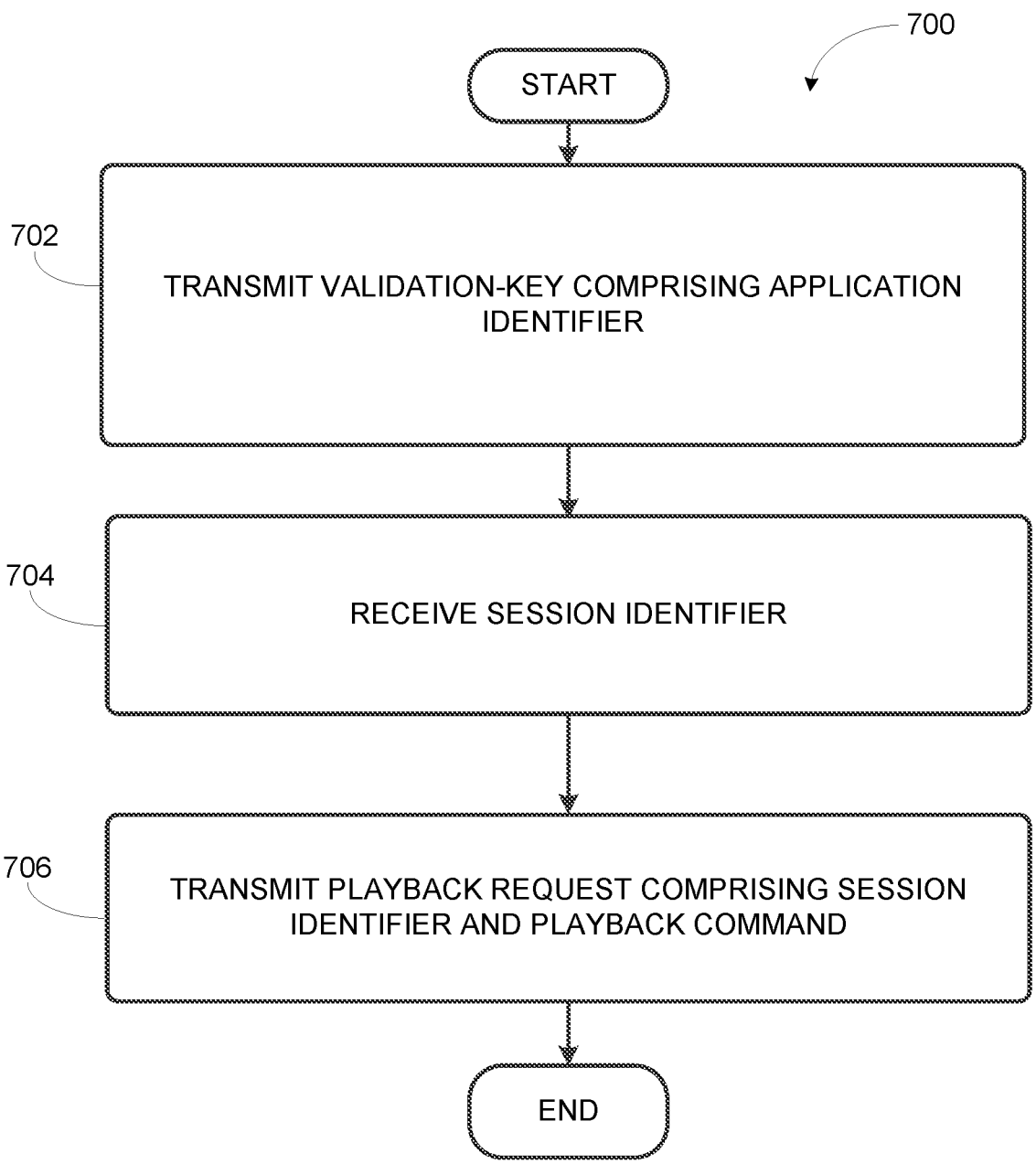
FIG. 7 shows an example flow diagram of an example method.

Method 700 shown in FIG. 7 presents an example method that may be implemented within an operating environment involving, for example, the media playback system 100 of FIG. 1 and one or more of the playback device 200 of FIG. 2. Method 700 may include one or more operations, functions, or actions as illustrated by one or more of blocks 702-706.

At block 702, the method 700 includes transmitting, by a computing device communicatively coupled to a media playback system, a validation-key, where the validation-key includes (i) an application identifier corresponding to a controller application through which one or more media items are added to a playback queue and/or (ii) a system identifier corresponding to the media playback system. As shown in FIG. 8, the control device 814 may transmit the validation-key 816 to the playback device 812. The validation-key transmitted by the control device 814 may be similar to the validation-key transmitted as part of the certification message 808 (e.g., at block 508 of FIG. 5) or the validation-key received by the playback device 812 (e.g., at block 602 of FIG. 6).

In one example, the computing device 802 may send within data 803 the validation-key to the control device 814, so that the control device 814 may send the validation-key 816 to the playback device 812. In another example (represented in FIG. 9), functions of the computing device 802 may be performed by the control device 814.

As shown in FIG. 9, before transmitting a validation-key, a control device 914 may send a validation-key request 916 to a server 906. The server 906 may determine that a controller application identified by the validation-key request 916 meets at least one quality-control metric. Based on the determination, the server 906 may send a certification message 917 (including a validation-key) to be received by the control device 914. The certification message 917 may indicate that the controller application meets at least one quality-control metric. The control device 914 may then send the validation-key 918 to a playback device 912. The playback device 912 may determine that the validation-key 918 is valid and send a session identifier 920 to the control device 914. The control device 914 may then send the session identifier back to the playback device 912 as part of a playback request 922.

Referring back to FIG. 7, at block 704, the method 700 includes, after transmitting the validation-key, receiving a session identifier corresponding to a playback device of the media playback system. For example, as shown in FIG. 8, the control device 814 receives the session identifier 818. A session identifier may be a data string uniquely corresponding to a single playback device. For example, a controller application may need to use additional session identifiers to control additional respective playback devices.

Referring again to FIG. 7, at block 706 the method 700 includes transmitting a playback request including (i) the session identifier and (ii) a playback command indicating a command related to playback of media by the playback device. For example, as shown in FIG. 8, the control device 814 transmits a playback request 820 that includes the session identifier and a playback command indicating a command related to playback of media by the playback device 812. In example implementations, transmitting the playback request 820 may include transmitting a universal plug and play (UPnP) request comprising an HTTP header comprising the session identifier 818. Other examples of playback requests are also possible.

Before transmitting the playback request 820, the control device 814 may determine that a duration of time remaining before the session identifier expires is less than a predetermined threshold amount of time and based on the determination, re-transmit the validation-key 816. For example, the control device 814 may determine that the session identifier 818 expires in 5 minutes. Based on the determination, the control device 814 may request a new session identifier by retransmitting the validation-key 816 with a new expiration times or by transmitting a new validation-key.

In another example, the control device 814 may transmit the playback request 820 and receive an error message 821, from the playback device 812, indicating that the session identifier 818 expired. Based on receiving the error message, the control device 814 may retransmit the validation-key 816 (or transmit a new validation-key) to the playback device 812 so that the playback device 812 may send a new (valid) session identifier 818 to the control device 814.

In some examples, the control device 814 may interact with or control more than one playback device. For instance, after transmitting the validation-key 816, the control device 814 may send the validation-key 824 to a second playback device 822 and receive, from the second playback device 822, a second session identifier 826 corresponding to the second playback device 822. The second session identifier 826 may be different from the first session identifier 818. The control device 814 may then transmit a second playback request 828 that includes the second session identifier 826 and a second playback command indicating a command related to playback of media by the second playback device 822. In this way, the control device 814 may use multiple session identifiers that are respectively associated with multiple playback devices. But in another example, the control device 814 may cause the first and second playback devices 812 and 822 to form a playback zone and playback media in synchrony, with the control device 814 perhaps using a common session identifier to control both playback devices 812 and 822. In such an example, the playback device 812 may be a zone coordinator of a playback zone that includes playback devices 812 and 822. That is, the playback device 812 may operate to control the playback device 822 and/or other playback devices of the playback zone, by sending playback commands to other playback devices of the playback zone and/or maintaining a playback queue for the playback zone, for example.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In one aspect, a method is provided. The method involves receiving, by a playback device of a media playback system, a validation-key, wherein the validation-key comprises an application identifier corresponding to a controller application through which one or more media items are added to a playback queue; based on at least the application identifier, creating a session identifier corresponding to the playback device; transmitting the session identifier receiving a playback request comprising (i) the session identifier and (ii) a playback command indicating a command related to playback of media by the playback device; determining that the received session identifier is valid; and based on determining that the received session identifier is valid, executing the playback command.

In yet another aspect, a non-transitory computer-readable medium is provided. The non-transitory computer-readable medium has stored thereon instructions executable by a playback device to cause the playback device to perform functions. The functions include receiving a validation-key, wherein the validation-key comprises an application identifier corresponding to a controller application through which one or more media items are added to a playback queue; based on at least the application identifier, creating a session identifier corresponding to the playback device; transmitting the session identifier; receiving a playback request comprising (i) the session identifier and (ii) a playback command indicating a command related to playback of media by the playback device; determining that the received session identifier is valid; and based on determining that the received session identifier is valid, executing the playback command.

In another aspect, a playback device is provided. The playback device includes a processor and a non-transitory computer-readable medium storing instructions that when executed by the playback device cause the playback device to perform functions comprising: receiving a validation-key, wherein the validation-key comprises (i) an application identifier corresponding to a controller application through which one or more media items are added to a playback queue; based on at least the application identifier, creating a session identifier corresponding to the playback device; transmitting the session identifier; receiving a playback request comprising (i) the session identifier and (ii) a playback command indicating a command related to playback of media by the playback device; determining that the received session identifier is valid; and based on determining that the received session identifier is valid, executing the playback command.

In another aspect, the disclosure includes a method that includes transmitting, by a computing device communicatively coupled to a media playback system, a validation-key, wherein the validation-key comprises an application identifier corresponding to a controller application through which one or more media items are added to a playback queue; thereafter, receiving a session identifier corresponding to a playback device of the media playback system; and transmitting a playback request comprising (i) the session identifier and (ii) a playback command indicating a command related to playback of media by the playback device.

In yet another aspect, a non-transitory computer-readable medium is provided. The non-transitory computer-readable medium has stored thereon instructions executable by a computing device communicatively coupled to a media playback system to cause the computing device to perform functions. The functions include transmitting a validation-key, wherein the validation-key comprises an application identifier corresponding to a controller application through which one or more media items are added to a playback queue; thereafter, receiving a session identifier corresponding to a playback device of the media playback system; and transmitting a playback request comprising (i) the session identifier and (ii) a playback command indicating a command related to playback of media by the playback device.

In yet another aspect, a computing device is provided. The computing device includes a processor and a non-transitory computer-readable medium storing instructions that when executed by the computing device cause the computing device to perform functions comprising: transmitting a validation-key, wherein the validation-key comprises an application identifier corresponding to a controller application through which one or more media items are added to a playback queue; thereafter, receiving a session identifier corresponding to a playback device of the media playback system; and transmitting a playback request comprising (i) the session identifier and (ii) a playback command indicating a command related to playback of media by the playback device.

In another aspect, the disclosure includes a method that comprises receiving, by a computing system communicatively coupled to a media playback system, a validation-key request comprising identification information related to a controller application through which one or more media items are added to a playback queue; determining that the controller application meets at least one quality-control metric; based on determining that the controller application meets the at least one quality-control metric, generating a validation-key, wherein the validation-key comprises an application identifier corresponding to the application; and transmitting a certification message indicating that the controller application meets the at least one quality-control metric, wherein the certification message comprises the validation-key.

In yet another aspect, a non-transitory computer-readable medium is provided. The non-transitory computer-readable medium has stored thereon instructions executable by a computing device communicatively coupled to a media playback system to cause the computing device to perform functions. The functions include receiving a validation-key request comprising identification information related to a controller application through which one or more media items are added to a playback queue; determining that the controller application meets at least one quality-control metric; based on determining that the controller application meets the at least one quality-control metric, generating a validation-key, wherein the validation-key comprises an application identifier corresponding to the application; and transmitting a certification message indicating that the controller application meets the at least one quality-control metric, wherein the certification message comprises the validation-key.

In yet another aspect, a computing device communicatively coupled to a media playback system is provided. The computing device includes a processor and a non-transitory computer-readable medium storing instructions that when executed by the computing device cause the computing device to perform functions comprising: receiving a validation-key request comprising identification information related to a controller application through which one or more media items are added to a playback queue; determining that the controller application meets at least one quality-control metric; based on determining that the controller application meets the at least one quality-control metric, generating a validation-key, wherein the validation-key comprises an application identifier corresponding to the application; and transmitting a certification message indicating that the controller application meets the at least one quality-control metric, wherein the certification message comprises the validation-key.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. Tangible, non-transitory computer readable media comprising program instructions stored therein, wherein the program instructions, when executed by one or more processors, cause a controller device to perform functions comprising:
   requesting a validation-key from a media system server, wherein the media system server is associated with a first playback device;
   after requesting the validation-key, receiving the validation-key from the media system server, wherein the validation-key comprises an application identifier for a controller application running on the controller device, wherein the controller application is associated with a media streaming service;
   transmitting the validation-key to the first playback device via a local area network;
   after transmitting the validation-key to the first playback device via the local area network, receiving a first session identifier from the first playback device via the local area network; and
   after receiving the first session identifier, causing the first playback device to play a first audio track from the media streaming service by transmitting a first playback request to the first playback device, wherein the first playback request comprises (i) the first session identifier and (ii) a first playback command that causes at least the first playback device to obtain the first audio track from the streaming media service and play the first audio track.

2. The tangible, non-transitory computer readable media of claim 1, wherein the validation-key further comprises a system identifier corresponding to the first playback device.

3. The tangible, non-transitory computer readable media of claim 1, wherein the first playback device is a member of a playback system comprising a plurality of playback devices, and wherein the validation-key comprises a system identifier corresponding to the playback system.

4. The tangible, non-transitory computer readable media of claim 1, wherein the validation-key further comprises data that identifies an expiration time.

5. The tangible, non-transitory computer readable media of claim 1, wherein the first session identifier is associated with an expiration time.

6. The tangible, non-transitory computer readable media of claim 1, wherein the first session identifier is associated with an expiration time, and wherein the functions further comprise:
   before transmitting another playback request to the first playback device, determining whether a duration of time remaining before the first session identifier expires is less than a threshold duration of time; and
   when the duration of time remaining before the first session identifier expires is less than the threshold duration of time, re-transmitting the validation-key to the first playback device via the local area network.

7. The tangible, non-transitory computer readable media of claim 1, wherein the first session identifier is associated with the first playback device.

8. The tangible, non-transitory computer readable media of claim 1, wherein transmitting the first playback request to the first playback device comprises transmitting a Universal Plug and Play (UPnP) request comprising a Hypertext Transfer Protocol (HTTP) header comprising the first session identifier.

9. The tangible, non-transitory computer readable media of claim 1, wherein the functions further comprise:
   transmitting the validation-key to a second playback device via the local area network;
   after transmitting the validation-key to the second playback device via the local area network, receiving a second session identifier from the second playback device via the local area network; and
   after receiving the second session identifier, causing the second playback device to play a second audio track from the media streaming service by transmitting a second playback request to the second playback device, wherein the second playback request comprises (i) the second session identifier and (ii) a second playback command that causes the second playback device to obtain the second audio track from the streaming media service and play the second audio track.

10. The tangible, non-transitory computer readable media of claim 1, wherein the first playback command that causes at least the first playback device to obtain the first audio track from the streaming media service and play the first audio track comprises one or more playback commands that cause the first playback device to obtain the first audio track from the streaming media service and play the first audio track in synchrony with at least a second playback device.

11. A controller device comprising:
   one or more processors;
   a tangible, non-transitory computer readable media; and
   program instructions stored on the tangible, non-transitory computer readable media that executable by the one or more processors such that the controller device is configured to:
   request a validation-key from a media system server, wherein the media system server is associated with a first playback device;
   after requesting the validation-key, receive the validation-key from the media system server, wherein the validation-key comprises an application identifier for a controller application running on the controller device, wherein the controller application is associated with a media streaming service;
   transmit the validation-key to the first playback device via a local area network;
   after transmitting the validation-key to the first playback device via the local area network, receive a first session identifier from the first playback device via the local area network; and
   after receiving the first session identifier, cause the first playback device to play a first audio track from the media streaming service by transmitting a first playback request to the first playback device, wherein the first playback request comprises (i) the first session identifier and (ii) a first playback command that causes at least the first playback device to obtain the first audio track from the streaming media service and play the first audio track.

12. The controller device of claim 11, wherein the validation-key further comprises a system identifier corresponding to the first playback device.

13. The controller device of claim 11, wherein the first playback device is a member of a playback system comprising a plurality of playback devices, and wherein the validation-key comprises a system identifier corresponding to the playback system.

14. The controller device of claim 11, wherein the validation-key further comprises data that identifies an expiration time.

15. The controller device of claim 11, wherein the first session identifier is associated with an expiration time.

16. The controller device of claim 11, wherein the first session identifier is associated with an expiration time, and wherein program instructions comprise further program instructions executable by the one or more processors such that the controller device is further configured to:
   before transmitting another playback request to the first playback device, determine whether a duration of time remaining before the first session identifier expires is less than a threshold duration of time; and
   when the duration of time remaining before the first session identifier expires is less than the threshold duration of time, re-transmit the validation-key to the first playback device via the local area network.

17. The controller device of claim 11, wherein the first session identifier is associated with the first playback device.

18. The controller device of claim 11, wherein the program instructions executable by the one or more processors such that the controller device is configured to transmit the first playback request to the first playback device comprise program instructions executable by the one or more processors such that the controller device is configured to transmit a Universal Plug and Play (UPnP) request comprising a Hypertext Transfer Protocol (HTTP) header comprising the first session identifier.

19. The controller device of claim 11, wherein program instructions comprise further program instructions executable by the one or more processors such that the controller device is further configured to:
   transmit the validation-key to a second playback device via the local area network;
   after transmitting the validation-key to the second playback device via the local area network, receive a second session identifier from the second playback device via the local area network; and
   after receiving the second session identifier, cause the second playback device to play a second audio track from the media streaming service by transmitting a second playback request to the second playback device, wherein the second playback request comprises (i) the second session identifier and (ii) a second playback command that causes the second playback device to obtain the second audio track from the streaming media service and play the second audio track.

20. The controller device of claim 11, wherein the first playback command that causes at least the first playback device to obtain the first audio track from the streaming media service and play the first audio track comprises one or more playback commands that cause the first playback device to obtain the first audio track from the streaming media service and play the first audio track in synchrony with at least a second playback device.

* * * * *